Dec. 8, 1953  I. JACOBSON ET AL  2,661,671
FLASHING UNIT ASSEMBLY FOR PHOTOGRAPHIC EXPOSURE EQUIPMENT
Filed April 22, 1948  7 Sheets-Sheet 2
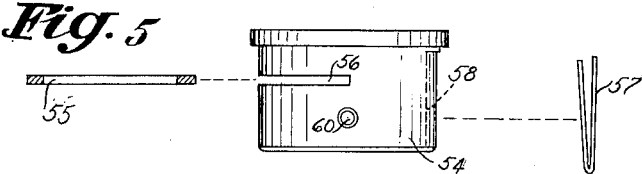
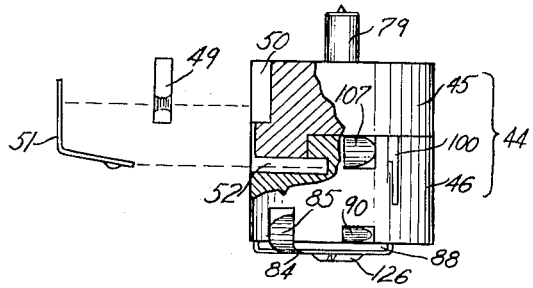
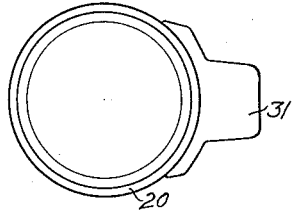
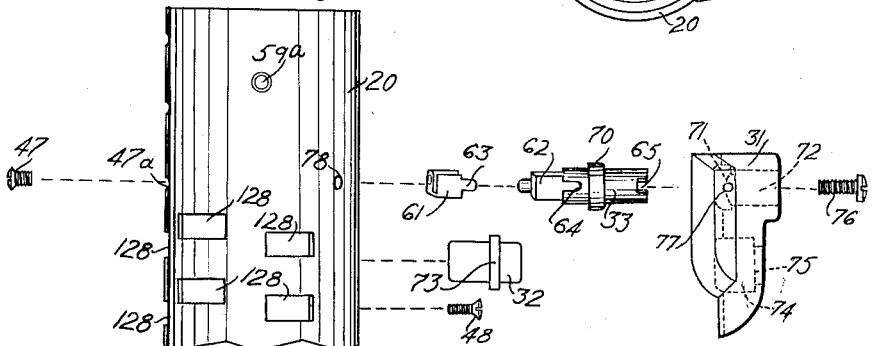
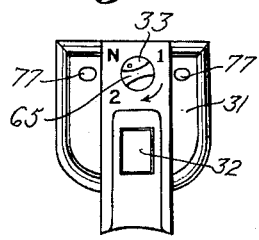
Inventors
Irving Jacobson
Clinton F. Brundage
Milford B. Moore
By Emery, Booth, Townsend, Miller and Lumiden
Attys.

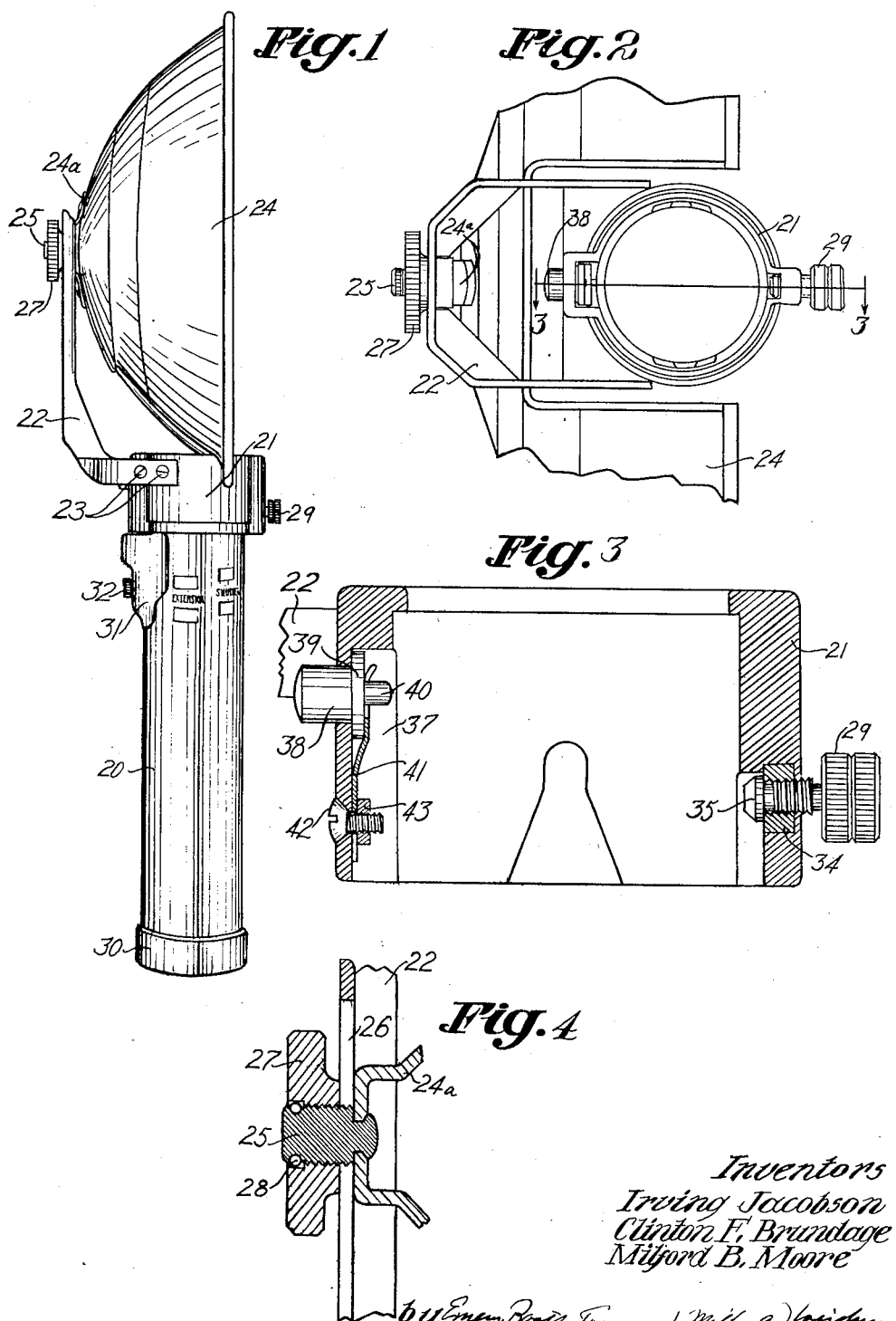

Dec. 8, 1953     I. JACOBSON ET AL     2,661,671
FLASHING UNIT ASSEMBLY FOR PHOTOGRAPHIC EXPOSURE EQUIPMENT
Filed April 22, 1948     7 Sheets-Sheet 3
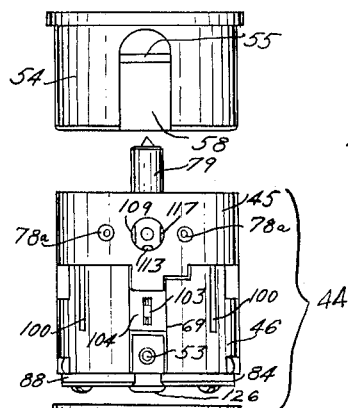
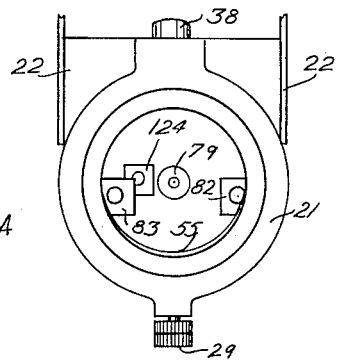
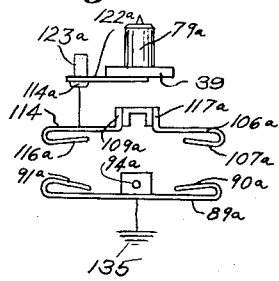
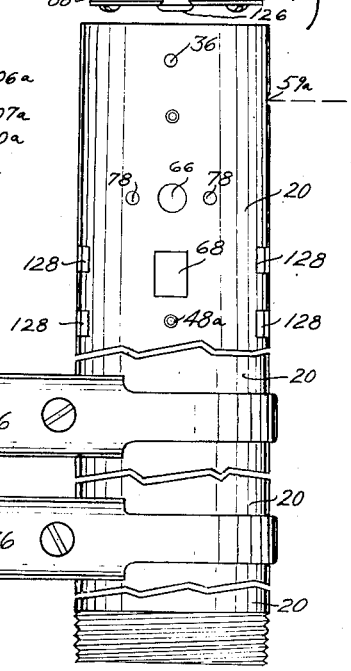
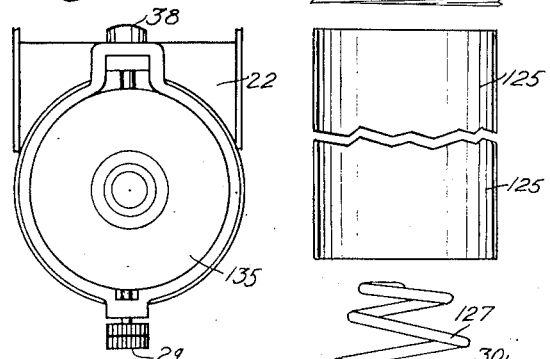
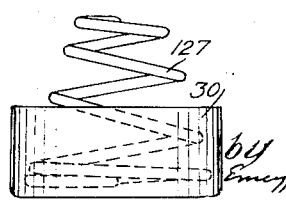
Inventors
Irving Jacobson
Clinton F. Brundage
Milford B. Moore
by
Attys.

Dec. 8, 1953   I. JACOBSON ET AL   2,661,671
FLASHING UNIT ASSEMBLY FOR PHOTOGRAPHIC EXPOSURE EQUIPMENT
Filed April 22, 1948   7 Sheets-Sheet 4
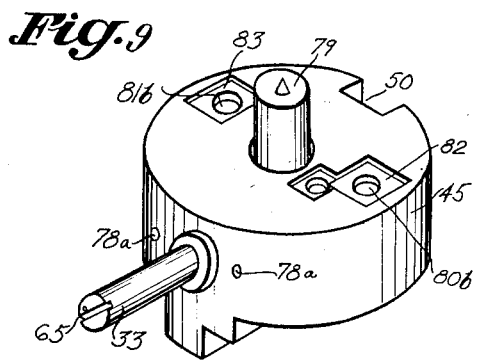
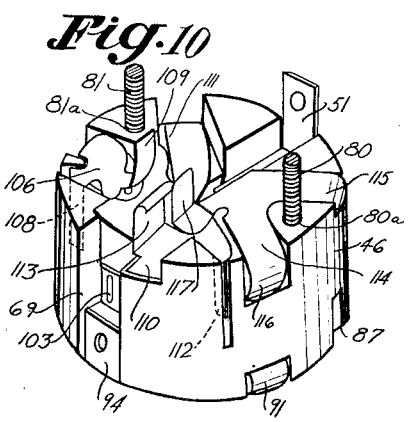
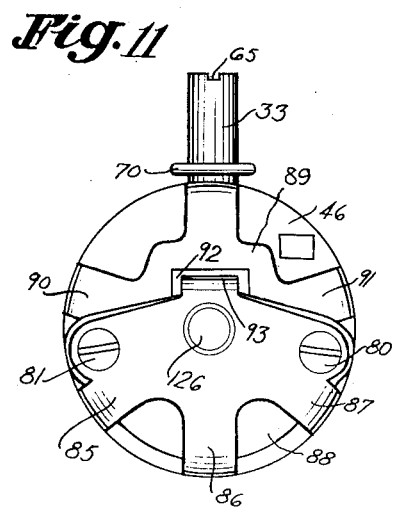
Inventors
Irving Jacobson
Clinton F. Brundage
Milford B. Moore Dec. 8, 1953     I. JACOBSON ET AL     2,661,671
FLASHING UNIT ASSEMBLY FOR PHOTOGRAPHIC EXPOSURE EQUIPMENT
Filed April 22, 1948     7 Sheets-Sheet 5
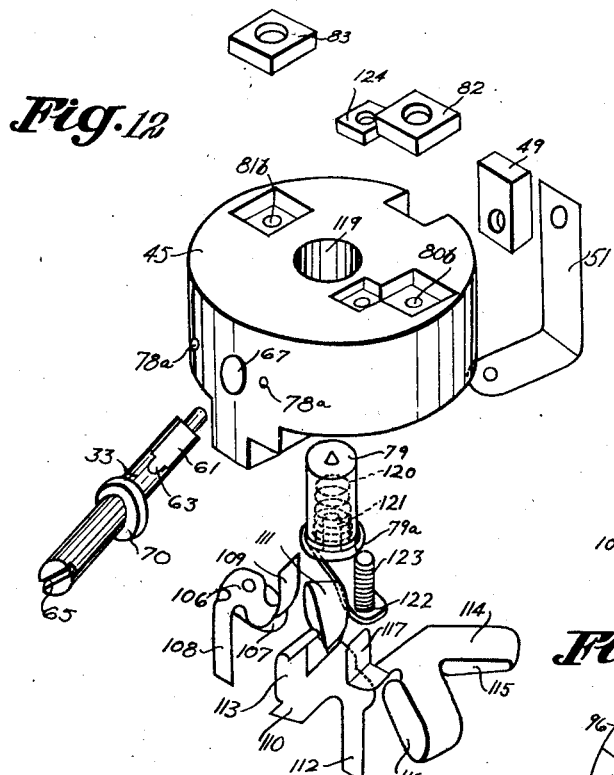
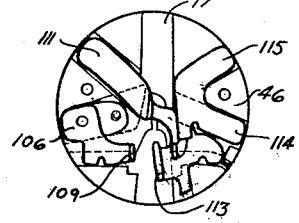
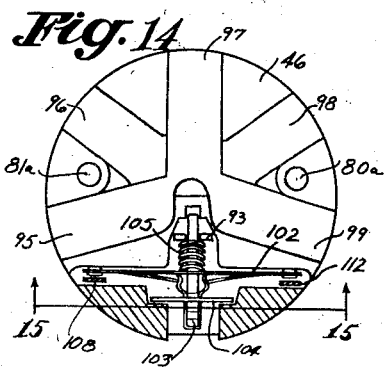
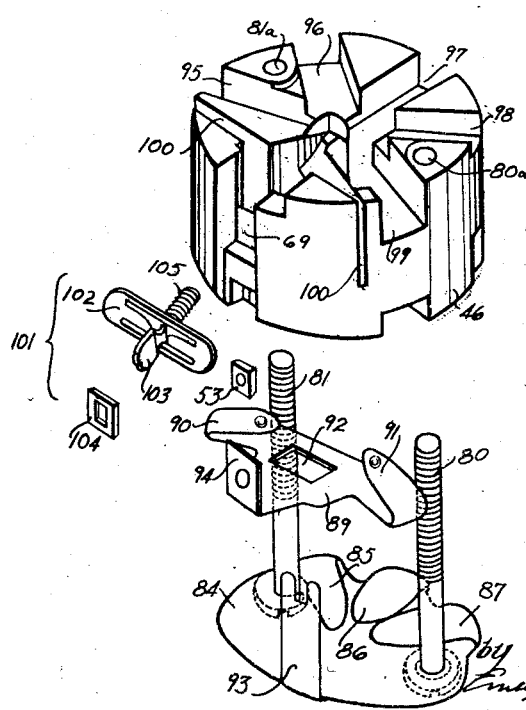
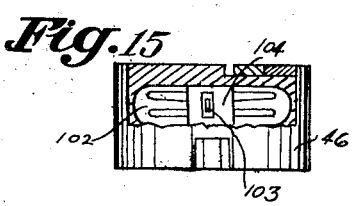
Inventors
Irving Jacobson
Clinton F. Brundage
Milford B. Moore Dec. 8, 1953     I. JACOBSON ET AL     2,661,671
FLASHING UNIT ASSEMBLY FOR PHOTOGRAPHIC EXPOSURE EQUIPMENT
Filed April 22, 1948     7 Sheets-Sheet 6
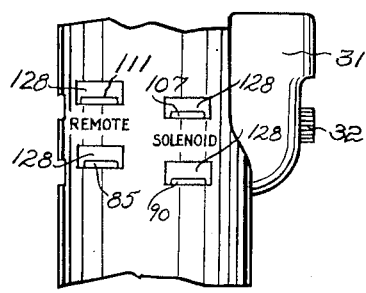
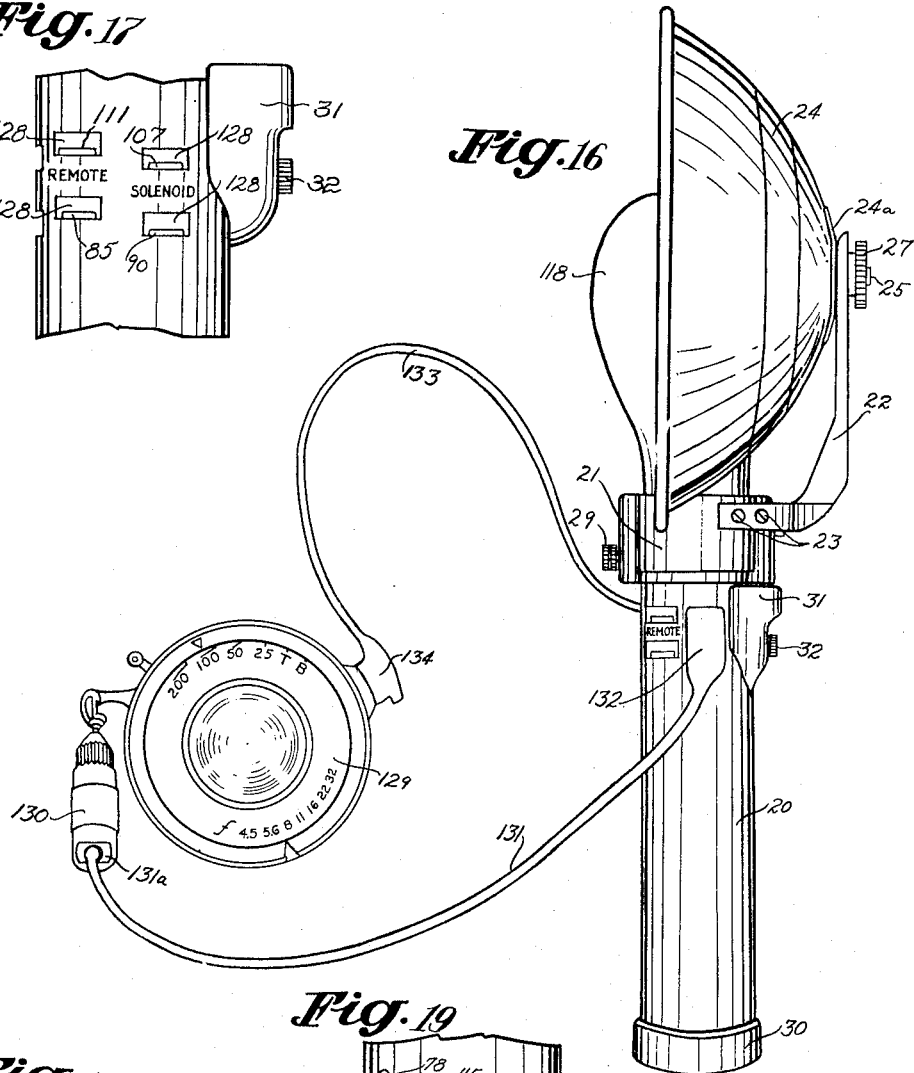
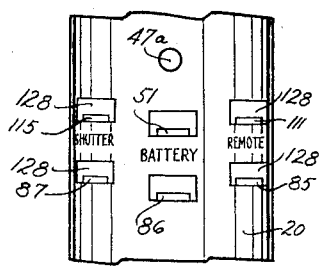
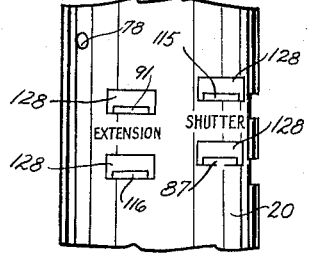
Inventors
Irving Jacobson
Clinton F. Brundage
Milford B. Moore

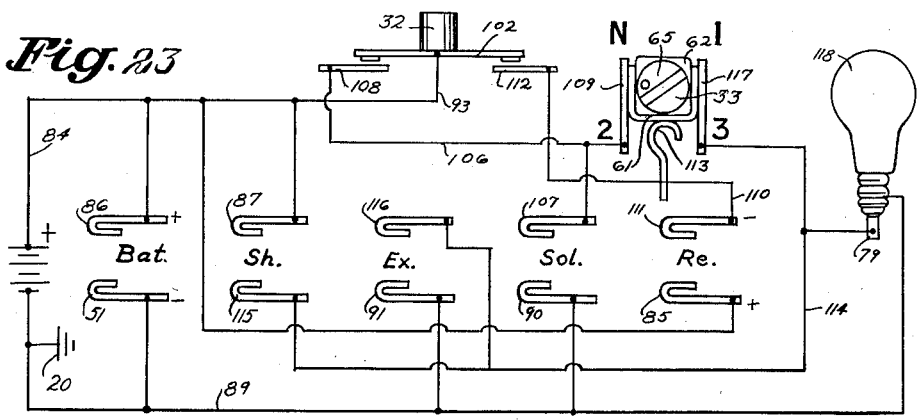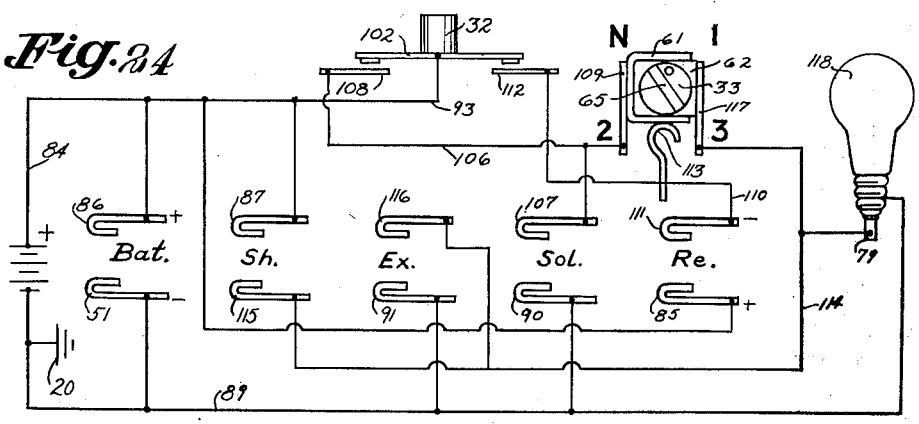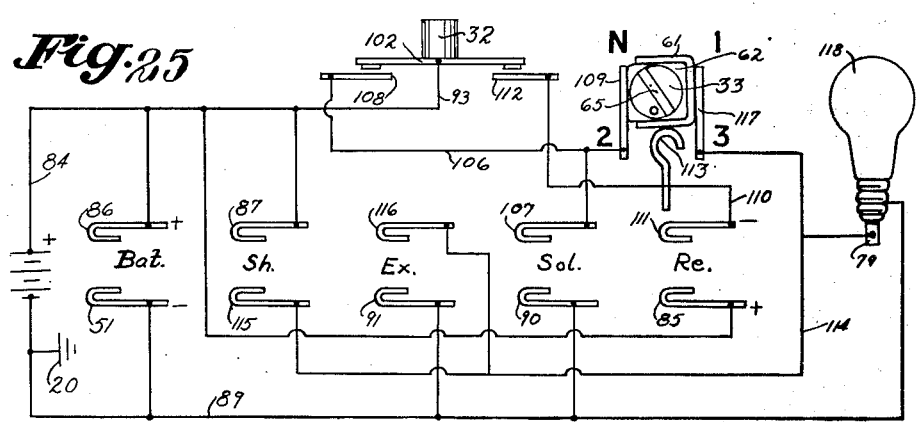

Patented Dec. 8, 1953

2,661,671

UNITED STATES PATENT OFFICE 2,661,671

FLASHING UNIT ASSEMBLY FOR PHOTOGRAPHIC EXPOSURE EQUIPMENT

Irving Jacobson, Hollywood, Calif., and Clinton F. Brundage, Macedon, and Milford E. Moore, Rochester, N. Y., assignors to Graflex, Inc., Rochester, N. Y., a corporation of Delaware Application April 22, 1948, Serial No. 22,614

15 Claims. (Cl. 95—11.5)

This invention relates to an improved battery case and associated equipment or apparatus to provide for synchronizing all types of photographic synchronizers.

In order that the principle of the invention may be readily understood, we have disclosed the preferred embodiment thereof in the accompanying drawings, wherein—

Fig. 1 is a left-hand side view of the battery case with the reflector in place;

Fig. 2 is a bottom plan view on an enlarged scale of the reflector mounting member removed from the battery case so as to show clearly the construction and attachment of the reflector bracket;

Fig. 3 is a horizontal section on an enlarged scale, taken through Fig. 2 on the line 3—3 thereof;

Fig. 4 is a detail partly in section of the reflector supporting bracket on an enlarged scale;

Fig. 5 is an exploded view of the battery case clearly showing the arrangement of the several parts, the contact mounting member being shown partly in section;

Fig. 6 is a top plan view of the battery case showing the position of the switch supporting member;

Fig. 7 is a detail in elevation of the switch supporting member;

Fig. 8 is a view similar to Fig. 5, but with the battery case rotated 90°, additional parts being also shown;

Fig. 9 is an isometric view of the upper half of the contact supporting member;

Fig. 10 is a view of the lower half of the contact supporting member;

Fig. 11 is a bottom plan view of Fig. 10;

Fig. 12 is an exploded view of the contact member assembly showing all of the parts related thereto;

Fig. 13 is a top plan view of Fig. 10;

Fig. 14 is an enlarged view partly in section of Fig. 13, some of the parts having been removed so as clearly to show the construction of the push button switch;

Fig. 15 is a vertical section taken through Fig. 14 on the line 15—15 thereof;

Fig. 16 is a right hand side view of the battery case and reflector assembly, connected to a between-the-lens shutter for solenoid operation, the firing contacts being built into the shutter and connected to the battery case for firing the lamp;

Fig. 17 is a fragmentary plan view of the right-hand side of the battery case, showing the location of the remote and solenoid connections;

Fig. 18 is a front view of the battery case similar to Fig. 17 but with the battery case rotated in a clockwise direction, so as most clearly to show the shutter, the battery and the remote connections;

Fig. 19 is a view similar to Fig. 17, but with the battery case rotated 90° in a contraclockwise direction so as to show the left-hand side of the battery case, and showing the position of the extension and shutter contacts;

Fig. 20 is a front view of the auxiliary lamp holding assembly;

Fig. 21 is a top plan view of Fig. 20;

Fig. 22 is a bottom plan view of Fig. 20;

Fig. 23 is a circuit diagram of the electrical connections of the battery case, the selector switch being shown in the "N" position;

Fig. 24 is a view similar to Fig. 23 but with the selector switch in the first position;

Fig. 25 is a view similar to Fig. 23, but with the selector switch in the second position; and Fig. 26 is a circuit diagram of the side lighting unit.

This invention relates to an improved battery case and associated equipment or apparatus to provide means for synchronizing all types of photographic synchronizers whether they be of the focal plane type or the front-shutter type having an electrical solenoid for both operating the shutter and synchronizing the lamp, or of the type of between-the-lens shutters with built-in contacts that are tripped by an electrical solenoid and flashing the usual type of foil or wire filled lamp. The herein disclosed equipment can also be used with a between-the-lens shutter having contacts for synchronization with a gaseous discharge lamp, the shutter being operated by means of an electrical solenoid. The battery case is so constructed that a number of different outlets are provided for connecting to associated equipment, and switching means is incorporated so as to connect or disconnect the several outlets for proper operation. The disclosed equipment is also adaptable to be used for multiple flash, by which it is meant that a lamp can be flashed in the controlling battery case and other lamps can be synchronized therewith by means of suitable extensions. One or more similar battery cases can be used for flashing both lamps in synchronism. Many other features of the invention will also be set forth in the ensuing description.

Important objects of the invention are: to provide a battery case having a self-contained switching arrangement to select different methods or manners of operation, to provide a simple unitary contact assembly, to provide a simple positive lamp ejecting means, to provide a battery case having a quickly removable and reversible reflector assembly, to provide a battery case assembly that can be attached to either side of a camera, and to provide a battery case assembly that can be used for the operation of any of the several different types, methods or manners of flash synchronization without the use of any additional equipment.

Referring more particularly to the drawings, wherein the different methods or manners of operation are shown, and referring first to Fig. 1, there is shown at 20 a battery case to which is fitted a reflector support member 21 having a bracket 22 that is attached to the reflector support member 21 by means of screws 23—23. To the bracket 22 a reflector 24 is attached by means of a bracket 24a and a clamp screw 25, which latter is riveted to the reflector bracket 24a. This condition is best shown in Fig. 4, wherein the bracket 22 is shown as provided with an elongated slot 26 through which passes the clamp screw 25. Threaded onto said screw 25 is a clamp nut 27, which is prevented from being turned entirely off the screw 25 by means of a stop ring 28. The reflector support member 21 is held to the battery case 20 by means of a clamp screw 29. To the lower end of the battery case 20 is fitted a cap 30 for retaining the batteries in the battery case 20. Also attached to the battery case 20 is a switch block 31, best shown in Fig. 7, and carrying the switch operating member or contact button 32 and a selector switch operating member 33. The switch block 31 is attached to the battery case 20 by means of suitable screws or other suitable fastenings 76—76, hereinafter more particularly referred to.

Referring to Fig. 2, the reflector support member 21 is there shown as removed from the battery case 20 and as viewed from the bottom of the reflector. The construction of the reflector support member 21 is most clearly shown in Fig. 3. Therein the screw 29 is shown as provided with a cone-shaped end 35 that engages a suitable opening 36 in the battery case 20, also shown in Fig. 8. A recess 37 is provided in the reflector support member 21 opposite the screw 29, and is best shown in Fig. 3. Through a suitable hole in the reflector support member 21 is fitted a push button 38 having a collar 39 and an extending finger or cylindrical formation 40. The said push button 38 is caused to be moved in an outward direction by means of a spring 41 attached to the reflector support member 21 by means of a screw 42 and a nut 43. The flash-bulb ejecting purpose of the push button 38 will be explained more fully presently.

Reference will next be made to Fig. 5, wherein is shown an exploded view of the battery case 20, which has been represented as broken away to foreshorten the length thereof for illustrating purposes.

The contact assembly block, indicated generally at 44, is made up of two separate blocks, the upper contact block 45 and the lower contact block 46. The said contact assembly block 44 is fitted into the battery case 20 and is held therein by means of screws 47, 48 passing through holes 47a, 48a. The screw 47 is threaded into a block 49 that is fitted into a suitable opening provided therefor in the said upper contact block 45, indicated at 50. When the block 49 is in position in the upper contact block 45, a spring contact member 51 is positioned against the upper contact block 45, and the extending finger thereof fits into an opening provided therefor, indicated at 52 in the lower contact block 46. When the contact assembly block 44 is in the proper position in the battery case, the screw 47 will pass through the hole 47a and through a hole in the contact member 51 and is threaded into the said block 49. The screw 48 will pass through a hole 48a in the battery case 20, and will be threaded into a similar block or nut, indicated at 53 in Fig. 8. A lamp guide block or ring 54 is fitted with a sliding ejector ring 55 that is fitted through an opening 56 and into a suitable groove in the lamp guide block or ring 54. The said sliding ejector ring 55 is provided with a spring 57 that tends to move the said ring 55 to the left, viewing Fig. 5, when the spring 57 is in place in a slot provided therefor, indicated at 58.

When the sliding ejector ring 55 and the spring 57 are in place, the lamp guide block or ring 54 is fitted into the end of the battery case 20 and is held thereto by means of a suitable screw 59 passing through a hole 59a in the battery case 20 and threaded into a hole 60 in the lamp guide block or ring 54. This construction will be referred to more fully presently.

The selector switch operating member 33 is provided with a contact member 61 that fits over a squared end 62 of the said member 33. Said contact member 61 is provided with a key formation 63 that fits into a suitable groove 64 of said member 33, which is also provided with a slotted end indicated at 65, for turning said member 33. The assembly, made up of said member 33 and said contact member 61, is fitted into an opening provided therefor through the battery case 20 and indicated at 66, Fig. 8, and into a suitable opening 67 of said upper contact block 45. The switch operating member or contact button 32, previously referred to, is fitted into a suitable opening in the battery case 20, indicated at 68, and into a suitable opening in the lower contact block 46, indicated at 69.

The said selector switch operating member 33 is provided with a cylindrical flange-like formation 70 and a suitable formation 71 is provided in the said switch block 31. The cylindrical extension of the selector switch operating member passes through a hole 72 in the switch block 31.

The switch operating member or contact button 32 is provided with a flange 73, and a suitable opening is provided for it in the switch block 31, being indicated in dotted lines at 74. An extension of the switch operating member or contact button 32 passes through a suitable hole in the switch block 31, indicated in dotted lines at 75. When the selector switch operating member 33 is in proper position in the battery case 20, and the switch operating member or contact button 32 is also in proper position, the switch block 31 is then fitted over the respective parts and is held to the battery case 20 by means of screws 76—76 passing through holes 77—77 in the switch block 31 and through holes 78 in the battery case 20 and threaded into holes 78a in the upper contact block 45.

Reference will now be made to Figs. 9 to 15.

In Fig. 9 is shown the upper contact block assembly 45 in perspective, having the selector switch operating member 33 assembled thereto and with the contact member 79 also in place.

In Fig. 10 is shown the lower contact block assembly 46 in perspective, having the several contact members in place, and this will be more fully described presently.

Fig. 11 is a bottom view of the two upper and lower contact blocks 45 and 46 assembled together and clearly shows the position of the several contact members. The said contact blocks 45 and 46 are held together by means of screws 80 and 81 passing through holes 80a and 81a in the contact block 46 and through holes 80b and 81b in the contact block 45, and threaded into nuts 82 and 83 respectively.

In Fig. 12 is shown the contact block assembly in an exploded condition. To the bottom of the lower contact block 46 is assembled a contact plate 84 having fingers 85, 86 and 87. The finger 85 forms the lower remote contact member, the finger 86 forms the lower battery contact member, and the finger 87 forms the lower shutter contact member. The screws 80 and 81, previously referred to, pass through the contact plate 84, and fitted over these screws is an insulating plate 88, not shown in Fig. 12 but shown in Fig. 11.

Referring to Fig. 11, over the insulating plate 88 is placed a second contact member or plate 89 having fingers 90 and 91, of which the finger 90 forms the lower solenoid contact and the finger 91 forms the lower extension contact. There is formed in the second contact member 89 a hole 92 through which a switch contact member 93 passes when the unit is assembled.

Also formed integral with said second contact member 89 is an upstanding formation 94 that constitutes means for grounding said second contact member 89 to the battery case 20 by means of the nut 53, previously referred to. When the said contact members 84 and 89 and the insulating plate 88 are assembled to the lower contact block 46, the latter will appear as shown in Fig. 11. To the upper face of said lower contact block 46 is assembled the upper group of contacts in suitable slots or openings provided therefor, indicated at 95, 96, 97, 98 and 99, Fig. 12.

A slot 100 is also provided across the lower contact block 46, into which is fitted a switch assembly 101 (best shown in assembled condition in Figs. 14 and 15) made up of a switch contact plate or member 102, a switch operating bar 103, a switch back plate 104 and a spring 105. The spring 105 of the said switch assembly 101 makes contact with the upstanding member 93. The switch assembly 101 is of well known construction of the snap-action type, and is not claimed herein per se, but it is here used in a novel relation involving a new combination of parts.

Referring particularly to Fig. 12, there is fitted into opening 95, previously referred to, a contact member 106 having an extending finger 107 that constitutes the upper solenoid contact, a downwardly extending arm 108 that constitutes one contact member for the switch assembly 101, and an upstanding member 109 that constitutes a contact member for the circuit selecting switch.

Fitted into the groove 96 is a contact member 110 having a contact arm 111 that constitutes the upper remote contact and a downward extending arm 112 that constitutes the second contact member for the switch operating bar 103, and an upstanding member 113 that provides one of the contacts for the circuit selector switch. Into the slots or openings 98 and 99 is fitted a contact member 114 having an arm 115 that constitutes the upper shutter contact, a second arm 116 that constitutes the upper extension contact, and an upstanding member 117 that forms a third contact member of the circuit selector switch.

When the upper and lower contact blocks 45 and 46 are assembled, the contact member 61, previously referred to, will lie in the opening 97 and forms the upper battery contact.

The contact members 109, 113 and 117 form the three contacts of a circuit selector switch, and the contact member 61, previously referred to, of the selector switch operating member 33 is so constructed that it can be rotated to contact with all of the selector switch contacts or any one of them can be disconnected from the circuit, because the said contact member 61 covers three sides only of the contact selector switch operating member 33, the uncovered face acting as an insulator. This is most clearly shown in the circuit diagram Figs. 23, 24 and 25, subsequently more specifically described herein.

To make contact with the flash lamp 118, shown in Fig. 16, we have provided the contact member 79, previously referred to, that fits into a hole 119 of the upper contact block 45. The lower end of the hole 119 is counterbored to receive the cylindrical flange 79a of the contact member so as to allow it to have movement in an upward direction. The said contact member 79 is bored out to receive a coiled spring 120, shown in dotted lines Fig. 12, and which fits over a pin 121, also shown in dotted lines, that is in turn riveted to a flat member 122.

The assembly just referred to, consisting of the lamp contact member 79 and the flat member 122, is assembled into the upper contact block 45 and is held thereto by means of a screw 123 and a nut 124.

When the two upper and lower contact blocks 45 and 46 with the respective parts assembled thereto, as just described, are fitted together, they are clamped in position by the screws 80 and 81 and the nuts 82 and 83 respectively. The assembly will then appear as shown in Fig. 8. When the said upper and lower contact blocks 45 and 46 are clamped together, contact will be made between the contact member 114 and the screw 123, thus completing a circuit to the lamp contact member 79. The contact assembly block 44, consisting of the two contact blocks 45 and 46, is then fitted into the battery case 20 in the manner previously described, as is also the lamp support block or ring 54.

An insulating liner 125, Fig. 8, is fitted into the battery case 20. Flash lamp batteries are then placed in the battery case 20 from the bottom in the usual manner and the positive contact of the battery will contact with a protrusion 126 of the contact plate 84, best shown in Figs. 8 and 11. The cap 30 is then screwed onto the bottom of the battery case 20 and a coiled spring 127 will then contact with the negative side of the batteries.

The battery case 20 can be made of any length to accommodate any number of batteries. Three are generally used connected in series. When the battery case 20 is completely assembled, it will appear as in Figs. 1 and 16. There will be five different sets of contacts available for use and, for purposes of description, these contacts are labeled solenoid, remote, battery, shutter and extension. The location of these several contact outlets is best illustrated in Figs. 17, 18 and 19.

Contact is made to the contacts contained in the contact assembly block 44 through openings 128—128 of the battery case 20 and the construction is such that an ordinary household electrical plug can be used for making contact.

In Fig. 16 there is shown the battery case 20 and a standard well-known type of between-the-lens shutter, indicated at 129. A solenoid 130 is shown in position for operating the shutter electrically. The said solenoid 130 is of well-known construction and preferably such as disclosed in the patent to Oscar Steiner, No. 2,293,477, August 18, 1942, and the shutter 129 can be any of the well-known shutters having built-in contacts for synchronizer flash lamps, such as shown in the patent to F. A. G. Pirwitz, No. 2,404,526, July 23, 1946.

For this type of operation, a cable 131 having plugs 131a and 132 are plugged into the outlet marked "solenoid" in the battery case 20, the plug 131a is connected to the solenoid 130, and a cable 133 having a plug 134 is attached to the contacts provided on the shutter 129. A plug of the same construction as shown at 132 is plugged into the shutter outlet of the battery case 20. For this type of operation, the circuit selector switch is in position as shown in the circuit diagram Fig. 24. This subject-matter will be referred to more fully when describing the circuit diagrams Figs. 23, 24 and 25.

In the use of photo flashlight equipment, it is desirable that more than one light be capable of being synchronized with the shutter of the camera. In accordance with our invention, means are provided for synchronized operation for a number of lights or flash bulbs.

In Figs. 20, 21 and 22 there is shown what will be referred to as a side lighting unit that consists of a short section of tubing, indicated at 135, to which is fitted the reflector support ring 21, previously referred to, and that carries the reflector and the flash-bulb ejecting button 38, previously briefly referred to. The tube 135 is also provided with the lamp guide block or ring 54 that carries the ejector ring 55 and the ejector ring spring 57, previously referred to.

A contact carrying assembly similar to the contact assembly block 44 in Fig. 5 is fitted into the tube 135 and is held there by screws 76a—76a. However, the structure of the contact assembly block 44 is here modified in that there is provision for only two sets of contacts and a contact for the flash lamp. These contacts are made up of the contact plate 89, previously referred to, fitted to the bottom of the lower contact block 46 and the contact members 106 and 114 fitted to the upper contact block 45. The lamp contact member 79 is fitted to the upper contact block 45 by the screw 123 in the manner previously described, and when the upper and lower contact blocks 45 and 46 are assembled, contact will be made between the screw 123 and the contact member 114. The said upper and lower contact blocks 45 and 46 are held together by the screws 80 and 81. The contact members 106 and 114 are connected together by a short circuiting metal member 136, best shown in the circuit diagram Fig. 26. The contact member 89 is grounded to the case 135 by means of the screw 48a and the nut 53 previously referred to. In the tube 135, there are provided openings 128a, 128a for the insertion of the electrical plug.

In Fig. 26 is a circuit diagram of the side lighting unit as previously mentioned. The contact parts of this assembly are made up of some of those parts used in the battery case 20, previously described. For clearness in describing these parts, shown in Fig. 26, we have used the same reference numerals but have added a suffix "a". It will be noted that the contact member 89a is grounded to a tab 94a, that the contact members 114a and 106a having switch contact fingers 117a and 109a respectively are connected together by a short circuiting member 136, that the contact member 109a is connected to the lamp connecting plug 79a, and that the lamp guide block or ring 54 is grounded to the case 135. Thus, the contacts 90a, 91a and the lamp guide block or ring 54 are all connected together, and the contacts 107a and 116a and the lamp 79a are also connected together.

Both the battery case and the extending or remote lamp holding unit are provided with novel lamp ejector means. The lamp guide block or ring 54 previously referred to, shown in Figs. 5 and 8, is provided with the sliding ejector ring 55 that is caused to be moved to the left viewing Fig. 5, by means of the spring 57. When the lamp guide block or ring 54 is assembled to the battery case 20, or the extension unit and the reflector support member are in place, the sliding ejector ring 55 will be displaced from a central location by the spring 57 and will then appear as shown in Fig. 21. If a lamp be placed in the lamp guide block or ring 54, the contact member 79 will be depressed against the coiled spring 120 and the lamp 118 will be held in the lamp guide block or ring 54 because the threads on the base of said lamp 118 will be engaged by the sliding ejector ring 55. The lamp will be held securely in place until released by having the said sliding ejector ring 55 shifted to a central position by means of the lamp ejector push button 38, previously referred to.

As previously described with reference to Fig. 3, the lamp ejector push button 38 is provided with the extending finger or cylindrical formation 40 that passes through a hole in the battery case 20 provided therefor and engages the sliding ejector ring 55 at a point opposite the spring 57. Thus, pressure applied to the ejector push button 38 will depress the sliding ejector ring 55 in a right hand direction viewing Fig. 5, and the lamp 118 will be ejected by the contact member 79 and its coiled spring 120.

There will now be described the circuit diagrams, shown in Figs. 23, 24 and 25, and there will be set forth the several different methods or means of operation of the apparatus of our invention.

The circuit diagrams, Figs. 23, 24 and 25, are similar excepting that the circuit selector switch operating member 33 is there shown in different positions. In Fig. 23, the circuit selector switch operating member 33 is in the "N" position or normal position. In this condition, a pressure on the switch operating member or contact button 32 will complete a circuit from the positive battery through the switch member 102 and the switch member 112 to the contact 113 through the switch shoe 61, the selector switch contact 117 and the lamp 118, and then back to the battery and ground of the battery case 20 which is the negative side of the battery.

The switch contact plate or member 102 will also complete a circuit through switch contact arm or member 108 and to the solenoid terminal 107 of the solenoid plug. If a circuit is completed from the solenoid plug to an electrical solenoid tripper device, current will flow through the solenoid and the solenoid finger 90 of the second contact member 89 to ground, completing a circuit through the solenoid 130.

When using the battery case 20 in connection with a so-called synchronized shutter (that is, a shutter having synchronizing contacts built therein such as is disclosed in the said patent to Pirwitz No. 2,404,526) the circuit selector switch operating member 33 is put in the position shown in Fig. 24, and a solenoid plug 132 is plugged into the solenoid receptacle of the battery case 20, and a solenoid, Fig. 16, is connected by the cord 131. The plug 134 is attached to contacts on the shutter 129, and it is provided with a multiple conductor cord 133 that has a receptacle on its opposite end (not shown) that fits into the shutter outlet or receptacle. In this manner of operation, when the operating member or contact switch button 32 is operated, a circuit is completed between the positive battery, the switch member 102, the switch arm or member 108 to the solenoid contact finger 107 through the cable 131, and the solenoid 130 back through the cable 131 to the solenoid contact finger 98, and then to ground which is the negative side of the battery, completing a circuit through the solenoid 130, but not through the lamp 118 because of the position of the selector switch operating member 33.

If the between-the-lens shutter 129 is operated, a circuit will be closed in the shutter, which will short circuit the shutter contact finger 87 and contact arm 115 through the plug 134 and the wire 133. A circuit will then be completed from the positive battery through the shutter contact finger 87, through the cable 133 and plug 134, and the shutter contacts, back through the cable 133 to the shutter contact arm 115 and then to the lamp 118, thus firing the said lamp.

In the first described method or manner of operation, a circuit is completed to the lamp 118 and the solenoid 130 at the same time. The necessary delay for operating the shutter to compensate for the delay in the ignition of the flash lamp is taken care of in the solenoid design which is fully disclosed in the Steiner Patent No. 2,393,477, previously referred to.

In the second described method or manner of operation, the solenoid 130 serves only to operate the shutter 129 and has nothing to do with the synchronization of the lamp 118, as the circuit to the lamp 118 is completed by the shutter 129 that has built therein a suitable timing mechanism. It will be apparent that two battery cases can be connected together by plugging a cord having suitable plugs into the remote receptacles and then the first described method or manner of operation can take place if both circuit selector switch operating members 33 are in the "N" position when either switch operating member or contact button 32 on either battery case is operated.

Of course, the second described method or manner of operation can be used, employing two battery cases having their remote terminals connected by suitable plugs and a connecting wire. The circuit selector switch operating member 33 will be in the position shown in Fig. 24. The shutter 129 can be connected to either battery case through the shutter receptacle and the operation can take place from either switch operating member or contact button 32.

Another means of operation is as follows. When it is desired to have one battery case attached to the camera and a second battery case located remote therefrom and because of the added resistance of a long connecting cord for the second flash lamp, it is desirable to apply a higher voltage to the lamp located in the second battery case and to maintain a normal voltage at the lamp in the battery case that is attached to the camera, while maintaining the normal voltage on the operating solenoid. This is readily done by setting the circuit selector switch operating member in the position shown in Fig. 25 with respect to the battery case 20 attached to the camera, while in the battery case in a remote location the circuit selector switch operating member 33 is placed in the position shown in Fig. 23.

A pair of leads having suitable connectors are plugged into the solenoid connection of the battery case 20 located at the camera and the connector on the opposite end of the said leads is plugged into the remote receptacle of the separate battery case. Polarity must be observed, and therefore the connectors will in this case be identified, so that the proper polarity can be maintained.

The solenoid operating the camera shutter 129 will be connected to the receptacle marked "Extension" on the battery case 20 that is attached to the camera. With this connection, when the switch operating member or contact button 32 of the battery case 20 at the camera is operated, the solenoid will be operated in the manner previously described and the flash lamp 118 located in the battery case 20 at the camera will be flashed. Both the solenoid and the battery case 20 will have 4½ volts applied and the extension or remote flash lamp 118 in the second battery case will be flashed at nine volts since each battery case carries three cells providing 4½ volts and in this mode of operation, the batteries will be in series with the second lamp at the moment of contact.

One or more extension lamps can be operated when any of the methods of operation just described is used, by merely connecting the extension unit shown in Fig. 20 to the receptacle marked "Extension" on the battery case, through the use of a suitable pair of conductors having proper connectors.

The diagrammatic representation shown in Fig. 26 has been previously and sufficiently described as a side lighting unit.

The battery case and flashing unit herein shown and described can be operated from focal plane shutter synchronizers such as disclosed in the patent to Jacobson et al. No. 2,406,691, August 27, 1946. One end of the pair of conductors having a suitable connector is plugged into the receptacle provided therefor on the synchronizer mechanism, and the opposite end thereof is plugged into the receptacle on the battery case marked "shutter." The circuit selector switch operating member 33 of the battery case will be in the position shown in Fig. 23.

We have herein disclosed a new flashing unit assembly that provides the utmost flexibility in its operation. We believe we are the first to provide such a device having switch control means to select any one of a number of different methods, manners or types of operation of associated photographic equipment. The assembly is of simple construction and can be manufactured at very low cost with relatively inexperienced help.

Having thus described one illustrative embodiment of the invention, it is to be understood that although specific terms are employed, they are used in a generic and descriptive sense and not for purposes of limitation, the scope of the invention being set forth in the following claims.

1. A flashing unit assembly for photographic exposure equipment comprising, in combination, a battery case having electrical connections for a battery positionable therein and having a plurality of electrical outlet terminals whereby operating connection may be made to any one of a plurality of types of associated photographic exposure equipment, and also having an operating switch, a plurality of contacts, one of which is connected to one side of the operating switch and also to an outlet terminal for one type of photographic exposure equipment, another of which is connected to an outlet terminal for another type of photographic exposure equipment, and a third of which is connected to an outlet terminal for a third type of photographic equipment, current conductors extending between and connecting each of said types of photographic equipment and the said contacts, a current conductor connecting the first-named contact with one side of the battery and a selector switch, said selector switch being manually movable to connect selectively any two of said plurality of contacts, and said operating switch being manually movable to establish electrical operating connections through its terminals between the contacts which are connected by the selector switch and the other side of the battery.

2. A battery case for a flashing unit assembly for photographic exposure equipment of tube-like construction, the lower end of which battery case receives the battery or batteries, said battery case having in its wall a plurality of different outlets for connecting to a corresponding number of different associated photographic equipments, a contact assembly block of substantially the same circumferential contour as said battery case and mounted therein above the battery or batteries, and means engaging the wall of said battery case for removably securing said contact block assembly in its position in said battery case, said contact block assembly having a plurality of electrical outlet terminals, whereby operating connections may be made through a corresponding outlet in the wall of the battery case, to any one, respectively, of an equal number of different associated photographic exposure equipments, a selector switch, a switch operating memer, both upon the outer wall of the battery case and closely adjacent to said contact assembly block, said selector switch operating member being manually movable into any one of a plurality of positions to establish in each different position electrical operating connection to a different one of such associated photographic equipments, there being current conductors extending between and electrically connecting, when the switch-operating member is duly operated, the respective ones of said different associated photographic equipments and the respective electrical outlets therefor, and constituting selective circuit connections by which when the selector switch operating member is moved to establish a desired electrical circuit and the switch operating member is operated, the selected one of the associated photographic exposure equipments is operated.

3. A flashing unit for photographic exposure equipment comprising a tubular battery case adapted to hold a battery, an operating switch, electrical wiring connecting said switch to one side of the battery, a pair of terminals positioned to be connected to said battery when said switch is closed, at least three terminal contacts, a movable selector switch which is adjustably shiftable to connect different pairs of said three terminal contacts together, two of said terminal contacts being connected, respectively, to the two terminals of said operating switch, the third of said terminal contacts and each of the other two terminal contacts being each connected, respectively, to one terminal of a different pair of electrical outlet terminals, and a plurality of electrically actuated photographic devices and current conductors extending between said photographic devices respectively and the respective electrical outlet terminals connecting the other terminal of each of said pairs of electrical outlet terminals with the battery on the opposite side of the battery from that to which the mating electrical outlet terminal is connected upon closing of said operating switch, each of said pairs of outlet terminals being constructed to be connected with one of said electrically-actuated photographic devices.

4. A battery case for a flashing unit assembly for photographic exposure equipment, in accordance with claim 3, wherein the selector switch operating member is rectangular in cross section at a part thereof, and there having four faces, said selector switch operating member being rotatably mounted in the wall of the battery case, so that, when turned, different conducting faces of the selector switch make contact with different terminals of said circuit wiring, and wherein said circuit wiring has three terminal contact members positioned for contact selectively with the four faces of said selector switch operating member.

5. A flashing unit for photographic exposure equipment in accordance with claim 3, wherein one of the terminal contacts is connected to two terminals of two different pairs of electrical outlet terminals.

6. A flashing unit for photographic exposure equipment in accordance with claim 3, wherein the said selector switch is multi-sided and is rotatable, and has a plurality of conducting contact faces and an insulating face, the said conducting contact faces being therefore adapted in different positions of rotation of the said switch to make electrical connection between different pairs of terminal contacts.

7. A flashing unit for photographic exposure equipment in accordance with claim 3, wherein one of the pair of outlet terminals to which said one terminal contact is connected, is a spring-pressed contact mounted co-axially on the battery case at one end thereof, and is co-axial with a flash lamp receiving socket in said end of the said battery case.

8. A flash unit assembly for photographic exposure equipment comprising a battery case adapted to contain an electric battery, a normally-open double contact switch mounted in said case and connected electrically to one side of said battery, a pair of contacts cooperating with said switch to be engaged on closing of said switch, a movable selector switch also mounted in said case, a set of at least three contacts associated with said selector switch, said movable selector switch in different positions thereof connecting together electrically different pairs of the contacts that are associated therewith, a plurality of electrical outlets in said case, each having a pair of terminals, electrical current conductors connecting one terminal each of two of said outlets with one another and with one of the contacts associated with said selector switch, electric current conductors connecting a second contact of the set of contacts associated with said selector switch with one terminal of a third outlet and with one of the first-named pair of contacts, electric current conductors connecting a third contact of the set of contacts associated with said selector switch with one terminal of a fourth outlet and with the other of the first-named pair of contacts, electric current conductors connecting the other terminals of the two first-named outlets with opposite sides, respectively, of said battery, and electric current conductors connecting the other terminals of said third and fourth outlets also with opposite sides, respectively, of said battery.

9. A flash unit assembly for photographic exposure equipment comprising a battery case adapted to contain an electric battery, a plurality of electrical outlets in said case for connecting the case selectively with a solenoid-operated shutter, the flash synchronizing device of such a shutter, and a flash lamp, respectively, a movable selector switch mounted in said case for selectively connecting said solenoid-operated shutter outlet electrically with said flash lamp outlet or with said flash-synchronizing outlet, a set of at least three contacts associated with said selector switch, said selector switch in different positions thereof connecting together electrically different pairs of said contacts, a normally-open double contact switch mounted in said case, a pair of contacts cooperating with said double contact switch, electrical conductors connecting said pair of contacts, respectively, with two of the contacts associated with said selector switch, electrical conductors connecting a third contact of the set of contacts associated with said selector switch, with said flash lamp outlet, and with said synchronizing device outlet, an electrical conductor connecting said double contact switch with one side of said battery, an electrical conductor connecting said synchronizing device outlet with the same side of said battery, and electrical conductors connecting the other two outlets with the other side of said battery.

10. A flash unit assembly for photographic exposure equipment comprising a battery case adapted to contain an electric battery, a plurality of electrical outlets in the case for connecting the case selectively with a solenoid-operated shutter, the flash-synchronizing device of such a shutter, and a flash lamp, respectively, and means for connecting said solenoid-operated shutter outlet electrically with said flash lamp outlet or with said flash synchronizing outlet, comprising a movable selector switch mounted in said case, a normally-open operating switch mounted in said case, and electrical conductors connecting said switches with one another and with said battery and with said outlets, whereby after electrical connection of a solenoid operated shutter and a flash lamp or a synchronizing device with their respective outlets, movable adjustment of said selector switch, and closing of said operating switch, said flash lamp or said synchronizing device is actuated in time with said shutter.

11. A flashing unit assembly for photographic exposure equipment comprising, in combination, a battery case adapted to hold an electric battery, a plurality of electrical outlets in said case whereby electrical operating connections may be made selectively between said case and at least one of a plurality of types of photographic exposure equipment including a front shutter, a focal plane shutter, and flash lamps, a selector switch mounted in said case and movable to any one of a plurality of positions for establishing in each of said positions electrical operating connection to different ones of said electrical outlets, an operating switch mounted in said battery case for manual operation, and electrical connections between said two switches, said battery and said outlets, whereby when the selector switch has been moved to the position required for operation of the selected photographic exposure equipment, and said operating switch is manually operated and the selected type of photographic equipment has the required connection to the battery case, said selected equipment will be actuated.

12. A flashing unit assembly for photographic exposure equipment comprising a battery case adapted to hold an electric battery in its lower end and to have ground contact therewith, a contact assembly block mounted above said battery, a movable selector switch mounted in said block, a socket for a flash lamp secured to said case to have ground contact therewith, a spring-actuated contact member mounted in said block and providing the other electrical contact for said lamp, electric outlets in said case for connection thereto of different electrically-operated photographic exposure equipment, a normally-open operating switch mounted in said block, and electrical conductors in said case interconnecting the battery, the two switches and the outlets, said selector switch being movable to different positions to select said lamp, and said outlets for electrical connection and disconnection thereof to said battery through said conductors when said operating switch is closed.

13. A flashing unit assembly for photographic equipment comprising a battery case adapted to hold an electric battery in its lower end and to have ground contact therewith, a contact assembly block mounted above said battery, a selector switch rotatably mounted in said block, a socket for a flash lamp secured to said case to have ground contact therewith, a spring-actuated contact member mounted in said block and providing the other electrical contact for said lamp, said contact member having spring-actuated movement in a direction substantially at right angles to the axis of rotation of said selector switch, electric outlets in said case for connection thereto of different electrically-operated photographic exposure equipment, a normally-open operating switch mounted in said block, and electrical conductors in said case interconnecting the battery, the two switches and the outlets, said selector switch being rotatable to different positions to connect and disconnect said lamp and said outlets selectively electrically with said battery through said conductors when said operating switch is closed.

14. A battery case for a flash unit assembly for photographic exposure equipment, said case being adapted to hold a battery in its lower end and having a plurality of electrical outlets for connection thereto of different electrically-operated photographic exposure equipment, a contact block assembly mounted above said battery, said contact block assembly being recessed at a plurality of spaced points, a corresponding number of contact arms received in said recesses, electrical conductors connecting said arms to said outlets, a selector switch mounted in said contact block assembly and movable into a plurality of different positions in each of which a different pair of outlets is selected for operation through said contact arms, electrical conducting means connecting said battery with said contact arms, and an operating switch movably mounted in said case for closing an electrical circuit from said battery through said contact arms and the pair of outlets selected for operation by said selector switch.

15. A flashing unit assembly for photographic exposure equipment comprising, in combination, a battery case having electrical connections for a battery positionable therein and having a plurality of electrical outlet terminals whereby operating connection may be made to anyone of a plurality of types of photographic exposure equipment, and also having a movable selector switch, three terminals cooperating with said selector switch, an operating switch connected to one side of the battery, and also to an outlet terminal for a shutter with synchronizing contacts, a pair of contacts cooperating with the operating switch, one of said contacts being connected to an outlet terminal for a remote control and also to a terminal of the selector switch, said outlet for the remote control being also connected to the same side of the battery as said operating switch, the other of said contacts being connected to an electro-magnetic shutter operating mechanism outlet and also to another terminal of said selector switch, and the third of said terminals being connected to an outlet for a flash lamp and to the outlet terminal for the shutter with synchronizing contacts, said outlets for the electro-magnetic shutter operating mechanism and for the flash lamp being also connected to the other side of the battery, said selector switch being manually operable to connect selectively any two of its terminals, and said operating switch being manually operable to establish the electrical operating connections through its contacts between the terminals which are connected by the selector switch, the terminal which is connected to the electro-magnetic shutter operating mechanism being so situated with reference to the terminal for the shutter with synchronizing contacts, that both terminals cannot be engaged simultaneously by the selector switch.

IRVING JACOBSON.
CLINTON F. BRUNDAGE.
MILFORD B. MOORE.

References Cited in the file of this patent

UNITED STATES PATENTS

| Number | Name | Date |
|---|---|---|
| 1,920,963 | Carpenter | Aug. 8, 1933 |
| 2,268,380 | Boesser | Dec. 30, 1941 |
| 2,302,031 | Jacobson | Nov. 17, 1942 |
| 2,329,011 | Steiner | Sept. 7, 1943 |
| 2,350,258 | Steiner | May 30, 1944 |
| 2,371,479 | Steiner | Mar. 13, 1945 |
| 2,437,373 | Bernstein | Mar. 9, 1948 |
| 2,467,591 | Lidfeldt | Apr. 19, 1949 |
| 2,496,680 | Schwartz | Feb. 7, 1950 |

FOREIGN PATENTS

| Number | Country | Date |
|---|---|---|
| 778,757 | France | Jan. 2, 1935 |